(12) United States Patent
Kriegshauser

(10) Patent No.: US 6,969,010 B1
(45) Date of Patent: Nov. 29, 2005

(54) LANDSCAPE AND AGRICULTURAL SPRAYER FOAM MARKING ATTACHMENT

(76) Inventor: Duane D. Kriegshauser, P.O. Box 925, Colby, KS (US) 67701

( * ) Notice: Subject to any disclaimer, the term of this patent is extended or adjusted under 35 U.S.C. 154(b) by 0 days.

(21) Appl. No.: 10/764,764

(22) Filed: Jan. 26, 2004

(51) Int. Cl.[7] .................................................. B05B 1/16
(52) U.S. Cl. ...................... 239/170; 239/338; 239/373; 239/172
(58) Field of Search ................................. 239/305, 307, 239/310, 372, 373, 150, 151, 159, 163, 170, 239/172, 338

(56) References Cited

U.S. PATENT DOCUMENTS

| | | | |
|---|---|---|---|
| 2,299,350 A | * | 10/1942 | Rowlands et al. .......... 239/339 |
| 2,842,465 A | * | 7/1958 | Harrison ........................ 134/7 |
| 3,481,545 A | | 12/1969 | Cooke |
| 3,584,788 A | * | 6/1971 | Lloyd .......................... 239/172 |
| 4,077,747 A | * | 3/1978 | Burenga ...................... 417/234 |
| 4,296,875 A | | 10/1981 | Borglum |
| 5,031,834 A | | 7/1991 | Simpson |
| 5,170,849 A | * | 12/1992 | Nikkel et al. ................... 172/6 |
| 5,865,379 A | * | 2/1999 | Dahl .......................... 239/690 |
| 6,308,866 B1 | | 10/2001 | Hoang |
| 6,314,996 B1 | | 11/2001 | Borglum |
| 6,651,908 B1 | | 11/2003 | Borglum |

* cited by examiner

Primary Examiner—Christopher Kim
(74) Attorney, Agent, or Firm—Randal D. Homburg

(57) ABSTRACT

A foam marking attachment to a lawn and garden tractor or tractor mounted agricultural implement spray apparatus attaches to a low voltage DC power supply of the tractor, applying a left or right side droplet of liquid marking foam to the outer edge of a traveled path, marking the traveled edge of application of a liquid spray from the spray apparatus, preventing over application to an area to be treated with the liquid spray and preventing non-application of the liquid spray the area to be treated with the liquid spray. The attachment may be used when applying liquid fertilizer, pesticide or herbicide to a golf course, yard, field, garden plot or other landscape area, and is used in place of colored spray or dyes which discolor the treated area and may be transferred to person, other objects or clothing. The attachment is best suited for golf courses and yards where people, clothing and pets often become discolored for an extended period after application of currently used dyes and colored sprays, which are difficult to remove from skin, hair and clothing.

2 Claims, 4 Drawing Sheets

LANDSCAPE AND AGRICULTURAL SPRAYER FOAM MARKING ATTACHMENT

CROSS REFERENCE TO RELATED APPLICATIONS

None

I. BACKGROUND OF THE INVENTION

1. Field of Invention

A foam marking attachment to a lawn and garden tractor or tractor mounted agricultural implement spray apparatus attaches to a low voltage DC power supply of the tractor, applying a left or right side droplet of liquid marking foam to the outer edge of a traveled path, marking the traveled edge of application of a liquid spray from the spray apparatus, preventing over application to an area to be treated with the liquid spray and preventing non-application of the liquid spray the area to be treated with the liquid spray. The attachment may be used when applying liquid fertilizer, pesticide or herbicide to a golf course, yard, field, garden plot or other landscape area, and is used in place of colored spray or dyes which discolor the treated area and may be transferred to person, other objects or clothing. Primary use may be for golf courses and yards where people, clothing and pets often become discolored for an extended period after application of the currently used dyes and colored sprays, which are difficult to remove from skin, hair and clothing.

2. Description of Prior Art

The following United States patents were discovered and are disclosed within this application for utility patent. All relate to foam marking devices applied to implements and used for agricultural and horticultural purposes.

In U.S. Pat. No. 6,651,908 to Borglum, a foam marking device comprises a first tank for containing a foam solution, and a second tank or tube mounted within the first tank, the first tank having a cap on the upper end, and the tube or second tank has a elongated slot along the tank or tube allowing the foam solution to enter the tube, evening the level of fluid in the first and second tanks, wherein an airstream is passed through a porous element in the bottom of the tube to generated bubbles passing upward in the tube above the solution level, passing the bubbles into a foam line exiting the first tank to be dispensed at a location. A second porous element is located at the end of the foam line to homogenize the exiting foam bubbles.

Another foaming liquid dispensing device is disclosed in U.S. Pat. No. 6,308,866 to Hoang, wherein a reservoir containing a foamable liquid with a closed headspace above the liquid surface. A gas source disposes an air pressure into the close headspace. A mixing chamber having an inside diameter and an inlet and an outlet open to the outside air with a flow restricter having a plurality of openings in gaseous communication with the closed headspace. An air pump as the gas source introduces air into the headspace generating bubbles which flow through a filter into the outlet where the generated foam is dispensed.

In U.S. Pat. No. 5,031,834, a marking foam system is disclosed having a connection to a power source to a compressor on/off switch, a solenoid control and a directional valve, an air compressor to generate compressed air which is directed through an air line having a check valve to a foam tube, a liquid foam material in a reservoir also directed through a liquid line by a liquid pump to the solenoid which further directs the foam material to the foam tube where the air and liquid are mixed producing a foam which is thus directed to yet another solenoid which may allow flow of the foam to a right or left dispensing tube to a dispensing nozzle.

Yet another foam marking system is disclosed in U.S. Pat. No. 6,314,996 to Borglum which again connects to a power source, the system disclosing the power being direct to a master control which activates a fresh water pump, a slave control which activates a concentrate pump, and to an air compressor, further comprising a concentrate reservoir containing a foam concentrate directed through the concentrate pump to a mixing chamber, a fresh water reservoir containing fresh water directed through the fresh water pump to the mixing chamber, the mixing chamber then directed the mixed foam liquid to a foam head, which is further connected to the air compressor via an air line, where the mixed foam liquid and air combine in one or more foam generating chambers to form foam which is dispensed to one or more outlets.

The above disclosed systems all provide a much more complicated configuration for generating and dispensing a marking foam at a margin of sprayer application. The current invention simply comprising a three way switch connected to DC power supply, two small air compressors being connected to the three way switch designated as left compressor and right compressor, each compressor connected by an air line with a regulator and a check valve to a left or right foam header having a bottle engaging cap attached to a left or right bottle containing a foam generating solution, each cap having an inlet connector attached to the air line, the inlet connector further directed to a central air tube extending to a bottom of each bottle, the cap also having an outlet connector opening into a headspace above the foam generating solution, further connected to a left or right foam line which extends to a left or right end of a sprayer boom used to apply liquid spray materials for agricultural and horticultural use. When the three way switch activates the right compressor, air is generated by the right air compressor and supplied to the right bottle of foam generated solution through the right foam header, producing foam to the right foam line to the right end of the boom. The when the three way switch activates the left compressor, air is generated by the left air compressor and supplied to the left bottle of foam generating solution through the left foam header, producing foam to the left foam line to the left end of the boom. The operator may select which side margin is to be marked during the spray application.

II. SUMMARY OF THE INVENTION

Foam dispensing device used in conjunction with boom arm sprayers on farm and garden tractor sprayers is well know in the prior art. Most of the prior art system employ water tanks, foam solution tanks, solenoid valves, secondary mixing chambers or foam tubes and complex electrical systems operating series of valves, switches and air generating units.

A simple component system which provides the same foam marking capability with much fewer operational and power requiring components is desired for yards, gardens, golf courses and acreages which is easily adapted to liquid spray application devices on the farm and garden tractor during application of fertilizers, insecticides, herbicides or even during seeding, if the present invention is applied to a drill or seeder.

The primary objective of the invention is to provide a foam marking device for lawns, gardens, golf courses and acreages which requires simple installation and low component requirements.

A secondary objective is to provide the device with simple interchangeable premixed bottles of foam marking solution which is changed by simply unscrewing a foam header from the bottle and attaching an new full bottle of the solution to the header.

A third objective is to provide the device select either the right side marking or left side marking with the simple throw of a three way switch, with the right side components segregated from the left side components.

III. DESCRIPTION OF THE DRAWINGS

The following drawings are submitted with this utility patent application.

IV. DESCRIPTION OF THE PREFERRED EMBODIMENT

Figure 1:
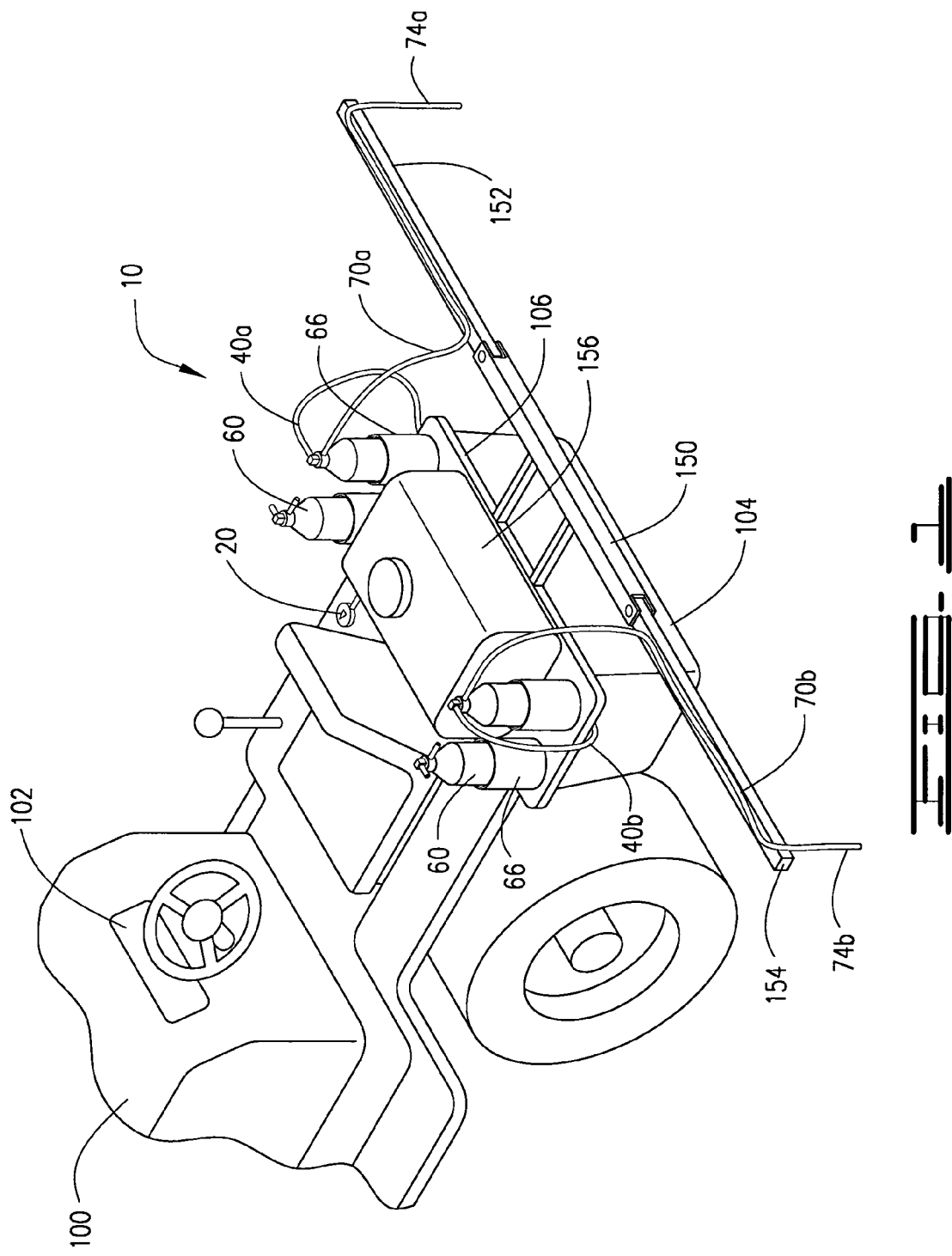
FIG. 1 is an upper perspective view of the attachment device on a farm or garden tractor with a boom sprayer apparatus.

A foam marking attachment device 10, shown in FIGS. 1–4, attaches to a chemical boom sprayer apparatus 150 having a right arm 152 and a left arm 154, the sprayer apparatus 150 mounted on a farm or garden tractor 100 operating on a low voltage DC electrical system 110, to mark a right or left outer boundary of a treated area of the sprayer apparatus 150, said attachment device 10 comprising essentially a three way power switch 20 attached to the low voltage DC electrical system 110 of the farm or garden tractor 100, two low voltage DC air compressors 30a, 30b attached to the three way power switch 20 by low voltage electrical wiring 24, the two air compressors 30a, 30b provided as a right air compressor 30a and a left air compressor 30b, each air compressor 30a, 30b giving rise to a respective right air line 30a and left air line 30b, each air line 30a, 30b having a check valve 42a, 42b and an air regulator 44a, 44b, each air line 30a, 30b attaching to a respective foam header 50a, 50b, designated as a right foam header 50a and a left foam header 50b, each foam header 50a, 50b having an inner threaded bottle engaging cap 52a, 52b, an inlet chuck 52a, 54b and an outlet chuck 56a, 56b. Each bottle engaging cap 52a, 52b is attached to a foaming solution bottle 60 having a bottom 64, each bottle 60 containing a foaming solution 80 with a headspace 82 above the foaming solution 80 within each bottle 60. Each bottle engaging cap 52a, 52b further includes a central tube 58a, 58b extending to the bottom 64 of each bottle 60, the central tube 58a, 58b connecting to the respective inlet chuck 52a, 54b by an inlet channel 55a, 55b in the bottle engaging cap 52a, 52b, with the outlet chuck 56a, 56b connected to an outlet channel 57a, 57b leading to the headspace 82 above the foaming solution 80. The outlet chuck 56a, 56b is further connected to a respective length of foam tubing 70a, 70b which extends along a respective arm 152, 154 of the boom sprayer apparatus 150, each length of foam tubing 70a, 70b having a restricted right angled elbow 72a, 72b connected to a vertical drop tube 74a, 74b, extending below the boom sprayer apparatus 150 to a level slightly above the right or left outer boundary of the ground being treated.

Once attached to the lawn or garden tractor 100 and the boom sprayer apparatus 150, the attachment device 10 is operated by activating the three way switch 20 to operate either the right air compressor 30a or the left air compressor 30b. The activated air compressor 30a, 30b then generates compressed air which is delivered through respective the air line 40a, 40b to the respective foam header 50a, 50b, further directing the air into the respective central tube 58a, 58b of the attached bottle 60, forcing air into the bottom 64 of the bottle 60 into the foaming solution 80, generating a foam 84 which is collected within the headspace 82 above the foaming solution 80. The foam 84 is then eliminated through the respective outlet channel 57a, 57b to the outlet chuck 56a, 56b into the respective length of foam tubing 70a, 70b, the foam 84 being compacted as it travels through the restricted right angle elbow 72a, 72b into the vertical drop tube 74a, 74b, where the compacted foam 84 is deposited upon a ground surface at either the left or right outer boundary of the treated area of the chemical boom sprayer apparatus 150. The lengths of foam tubing 70b associated with the left air compressor 30b is attached to the left arm 154 of the boom sprayer apparatus 150, while the length of foam tubing 70a associated with the right air compressor 30a is attached to the right arm 152 of the boom sprayer apparatus 150. The operator may select either the right or left boundary, depending on his course of application of a chemical spray product, by moving the three way switch 20 to activate either the right air compressor 30a, causing foam 84 to be delivered to the drop tube 74a corresponding to the right arm 152 of the boom sprayer apparatus 150, or to activate the left air compressor 30b, causing foam 84 to be delivered to the drop tube 74b corresponding with the left arm 154 of the boom sprayer apparatus 150.

The chemical spray product may include insecticide, fertilizer, and herbicide, although it is contemplated within the scope of this attachment, that the attachment may be applied to any lawn or garden tractor 100 being used for the above noted purpose, as well as for mowing, seeding, aerating, plugging or other application involving a farm or garden tractor 100 for which the application of the attachment device 10 would be useful marking the boundary between the treated and untreated areas.

When the three way switch 20 activates the right air compressor 30a, air is generated by the right air compressor 30a and supplied to the bottle 60 of foaming solution 80 through the right foam header 50a, producing foam 84 to the right foam tubing 70a to the right arm 152 of the boom sprayer apparatus 150. The when the three way switch 20 activates the left air compressor 30b, air is generated by the left air compressor 30b and supplied to the bottle 60 of foaming solution 80 through the left foam header 50b, producing foam 84 to the left foam tubing 70b to the left arm 154 of the boom sprayer apparatus 150. The operator may select which side margin is to be marked during the spray application.

Each foaming solution bottle 60 should contain at least two liters of foaming solution 80, which is a premixed solution of foaming agent and water which is mixed to proportion prior to placement in the bottles 60. This makes provision of a separate water reservoir, a foaming agent reservoir and a mixing chamber or tube unnecessary by including everything in one bottle. The action of the compressed air being forced from the bottom 64 of the bottle 60 through the foaming solution 80 is sufficient to generated the foam 84 required of this attachment device 10, the compressed air being delivered at a desired pressure controlled by the operator by adjustment of the regulators 44a, 44b in the air lines 40a, 40b. See FIG. 4. The generated foam 84 in the headspace 82 above the foaming solution 80 forces its way out of the outlet channel 57a, 57b into the outlet chuck 56a, 56b when sufficient foam is generated to do so. More than two bottles 60 containing foaming solution 80 may be present on the attachment device 10 to prevent time delaying refilling of the bottles 60, providing a quick change of the bottles 60 during operation of the attachment device 10. In this case, the device may also include a bottle retainer 66, FIGS. 1 and 2, to retain foaming solution bottles 60 in use with the device as well as those foaming solution bottles 60 carried as spares.

The attachment device 10 may further be defined as having quick connect fittings 45a, 45b on the air lines 40a, 40b beyond the check valve 42a, 42b and the regulator 44a, 44b allowing for a quick connection of the air line 40a, 40b to the inlet chucks 52a, 54b. Similarly, the foam tubing 70a, 70b may also be connected to the outlet chucks 56a, 56b using quick connect fittings 75a, 75b, to provide a quick disconnection and connection of the foam headers 50a, 50b from the air lines 40a, 40b and foam tubing 70a, 70b for cleaning the system after use to remove the foaming solution 80 residue in the foam headers 50a, 50b, bottles 60 and foam tubing 70a, 70b. See FIG. 3. These quick connect fittings 45a, 45b, 75a, 75b may also allow for the air line 40a, 40b to be connected directly to the foam tubing 75a, 75b using a quick connect fitting adapter (not shown) to purge the foam tubing 70a, 70b of residual foam 84 in the foam tubing 70a, 70b with air. The foam tubing 70a, 70b should be flexible, which would allow them to remain attached to the boom sprayer apparatus 150 when the boom arms 152, 154 are folded into a stored position after use. Swimming pool hose has been found to be most suitable as the foam tubing 70a, 70b or otherwise best presented as one inch clear plastic tubing to monitor the flow and quantity of foam being disposed to the vertical drop tubes 74a, 74b.

Figure 3:
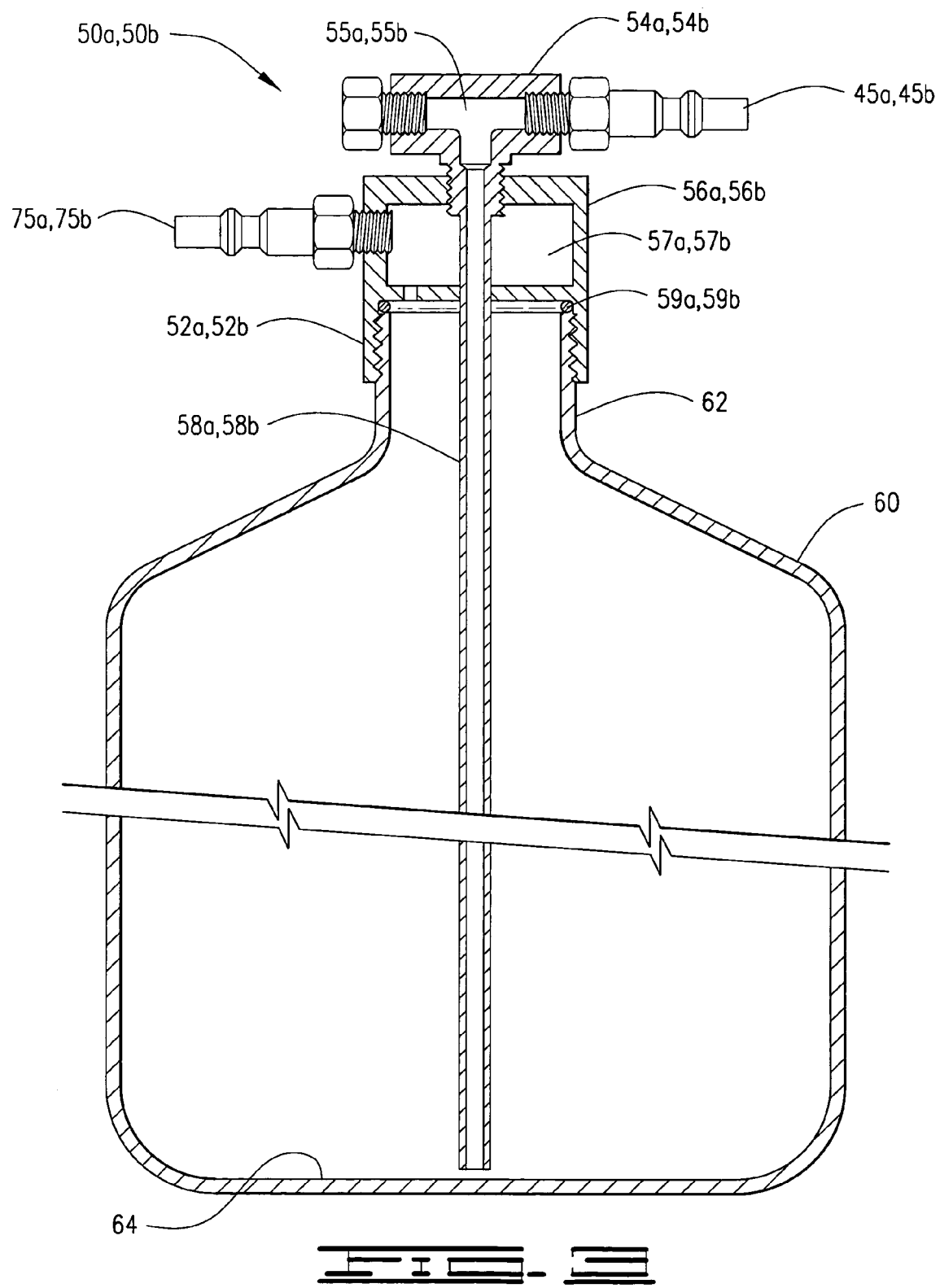
FIG. 3 is a cross sectional view of the foam header and the foaming solution bottle.
Figure 4:
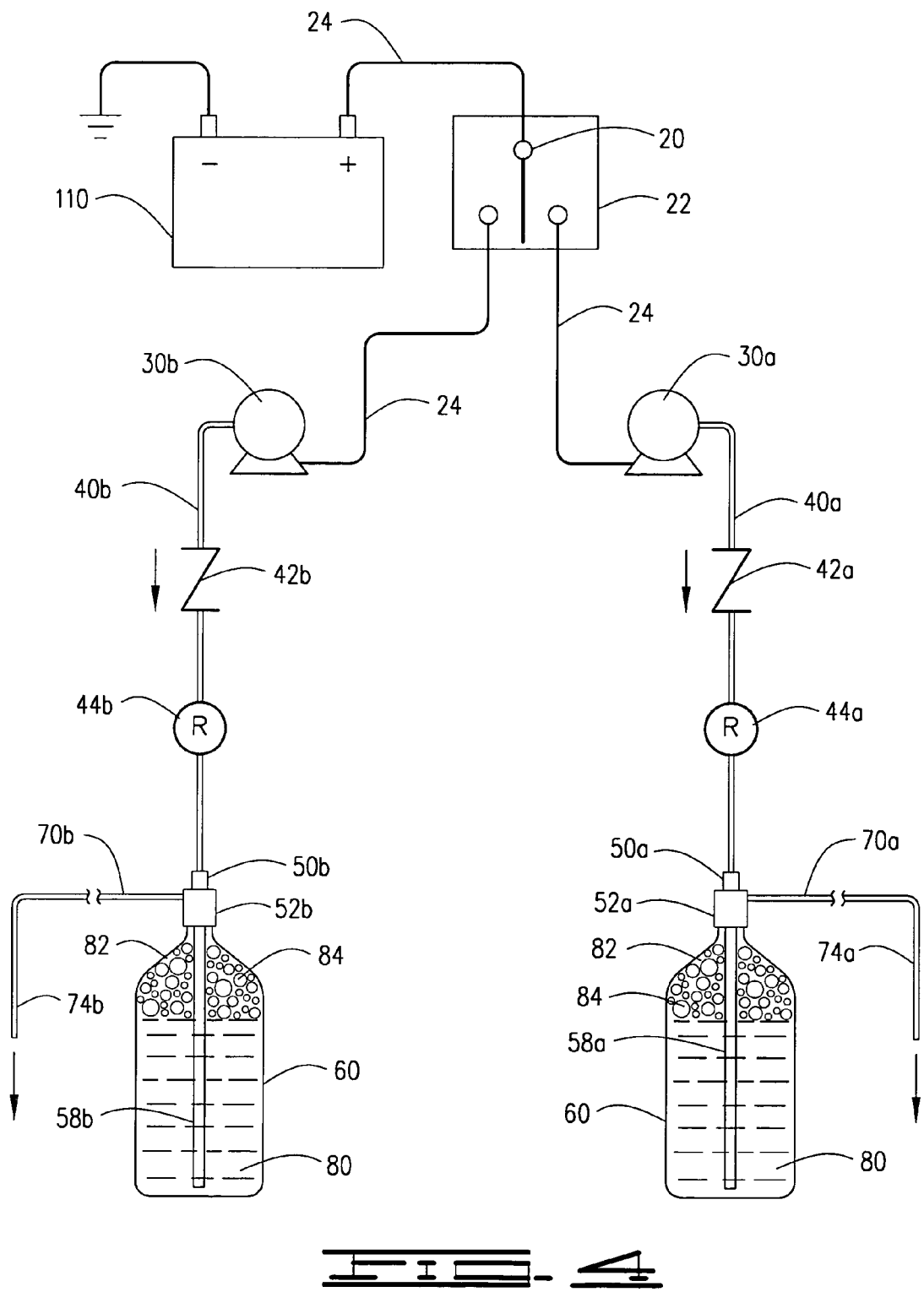
FIG. 4 is a component schematic diagram of the attachment device.

Presented in best mode, each of the bottles 60 should be no less than three liter plastic bottles 10 with a threaded neck 62, as shown in FIG. 3, adapted to engage the inner threaded bottle engaging caps 52a, 52b, with an O-ring 59a, 59b in each bottle engaging cap 52a, 52b to seal the threaded neck with the bottle engaging caps 52a, 52b. The quick connect fittings 45a, 45b, 75a, 75b should be a brass product or other non-corrosive product. The three way power switch 20 would be best installed at or near a control panel 110 on the farm or garden tractor 100, FIG. 1, for ease of access by the operator, and is generally provided in a housing 22, as shown in FIG. 4 of the drawings.

Figure 2:
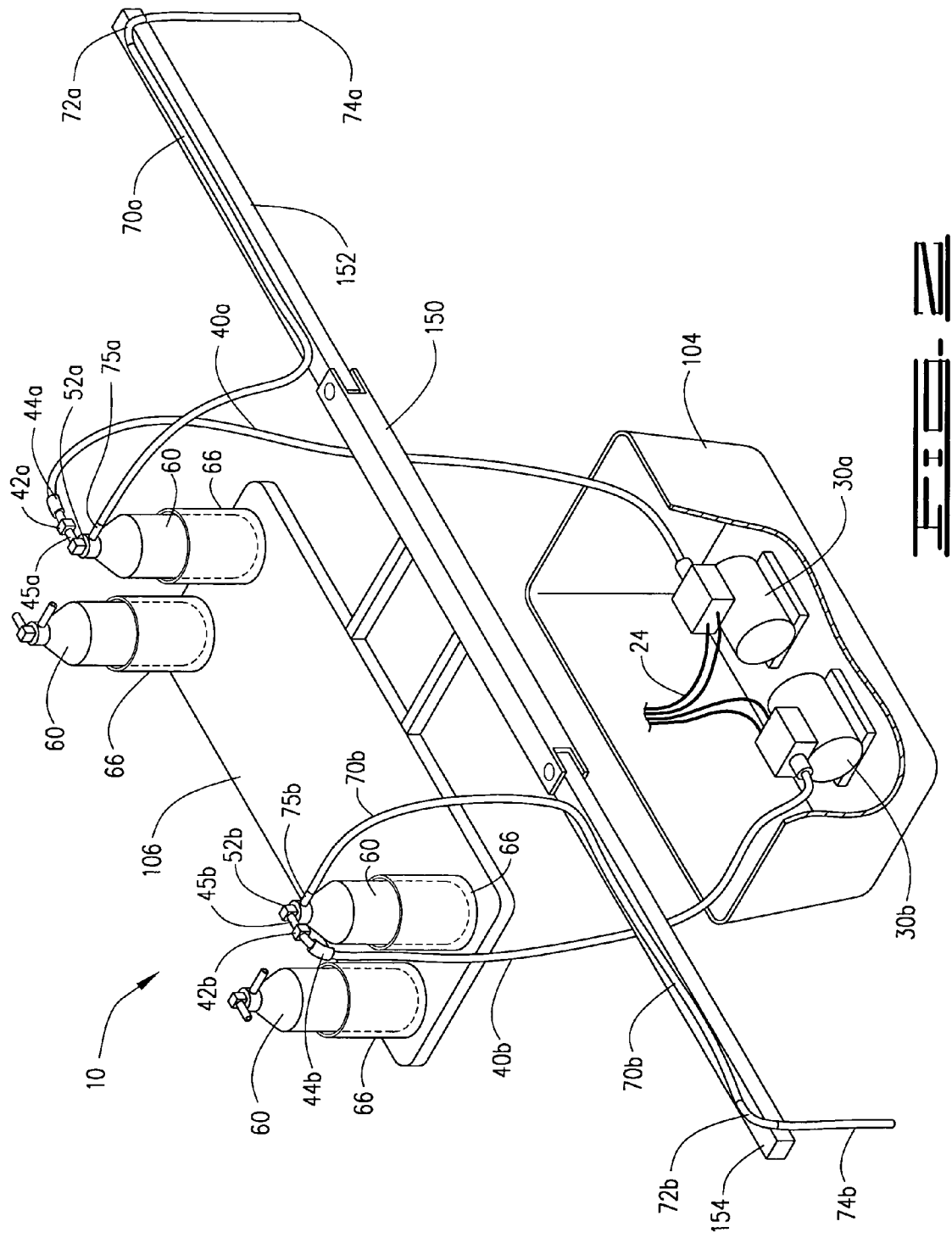
FIG. 2 is a view of the attachment device with the boom sprayer apparatus and part of the farm and garden tractor.

In the event there is a closed compartment 104 on the farm or garden tractor 100, as indicated in FIG. 2 of the drawings, the air compressors 30a, 30b would best be installed within that compartment 104 to reduce the noise produced by the air compressors 30a, 30b, as the air compressors 30a, 30b are the only tangible noise emitting device in the attachment device 10. The air lines 40a, 40b would thus emanate from a lid 106 of the closed compartment 104 to attach to the foam headers 50a, 50b, the lid generally supporting a spray tank 156 of the boom sprayer apparatus 150.

The foam headers 50a, 50b should be constructed of a non-corrosive product, which may include stainless steel, nylon, or other non-corrosive metal or plastic, as most foaming solutions have a corrosive character to them over time, which could oxidize other metals or decay non-suitable plastics.

Best suited use for the attachment device 10 would be for golf courses and yards where people, clothing and pets often become discolored for an extended period after application of the currently used dyes and colored sprays, which are difficult to remove from skin, hair and clothing.

While the invention has been particularly shown and described with reference to a preferred embodiment thereof, it will be understood by those skilled in the art that changes in form and detail may be made therein without departing from the spirit and scope of the invention.

What is claimed is:

1. A foam marking attachment device attaching to a chemical boom sprayer apparatus having a right arm and a left arm, the chemical boom sprayer apparatus mounted on a farm or garden tractor operating on a DC electrical system, said attachment marking a right or left outer boundary of a treated area of said chemical boom sprayer apparatus, comprises:

a three way power switch attached to said DC electrical system of said farm or garden tractor;

two air compressors attached to said three way power switch by low voltage electrical wiring;

air lines having a check valve and a regulator connected to each said air compressor;

a foam header attached to each said air line, said foam headers having a inlet chuck receiving compressed air from said air line into a hollow central tube;

a foaming solution bottle attaching to each said foam header, said foaming solution bottle having a bottom and containing a foaming solution, with said central tube from said foam header extending to said bottom of said foaming solution bottle when said foam header is attached to said foaming solution bottle, the compressed air passing through said foaming solution creating a foam within said foaming solution bottle within a headspace above said foaming solution;

an outlet chuck on each said foam header integrating with said headspace providing an outlet for said foam;

a foam tubing attached to each said outlet chuck, one said foam tubing attached to said right arm of said boom sprayer apparatus and the other said foam tubing attached to said left arm of said boom sprayer; and a vertical drop tube connecting to each said foam tube from which said foam is dispensed, said vertical drop tube extending below said boom sprayer above said treated area, wherein the three way switch allows for application of the foam to be dispensed to either said right or left outer boundary by activating one of said two air compressors which generates and delivers foam to said corresponding drop tube attached to the right arm or left arm of said boom sprayer apparatus.

2. A foam marking attachment device attaching to a chemical boom sprayer apparatus having a right arm and a left arm, the chemical boom sprayer apparatus mounted on a farm or garden tractor operating on a DC electrical system, said attachment marking a right or left outer boundary of a treated area of said chemical boom sprayer apparatus, comprises:

a three way power switch attached to said DC electrical system of said farm or garden tractor;

a right air compressor attached to said three way power switch by low voltage electrical wiring;

a right air line having a check valve and an air regulator;

a right foam header attached to said right air line, said right foam header having an inner threaded bottle engaging cap, an inlet chuck and an outlet chuck;

a foaming solution bottle having an upper threaded neck and a bottom, said upper threaded neck threadably attached to said bottle engaging cap, said foaming solution bottle containing a foaming solution with a headspace above said foaming solution within each foaming solution bottle, wherein said bottle engaging cap further includes a hollow central tube extending to said bottom of said foaming solution bottle, said central tube connecting to said inlet chuck by an inlet channel in said bottle engaging cap, with said outlet chuck connected to an outlet channel integrating with said headspace above said foaming solution;

a length of foam tubing connected to said outlet chuck extending along said right arm of said boom sprayer apparatus, said length of foam tubing having a restricted right angled elbow connected to a vertical drop tube from which foam is dispensed, said drop tube extending below said right arm of said boom sprayer apparatus above said right outer boundary of said treated area; and a left air compressor attached to said three way power switch by low voltage electrical wiring;

a left air line having a check valve and an air regulator;

a left foam header attached to said left air line, said left foam header having an inner threaded bottle engaging cap, an inlet chuck and an outlet chuck;

a foaming solution bottle having an upper threaded neck and a bottom, said upper threaded neck threadably attached to said bottle engaging cap, said foaming solution bottle containing a foaming solution with a headspace above said foaming solution within each foaming solution bottle, wherein said bottle engaging cap further includes a hollow central tube extending to said bottom of said foaming solution bottle, said central tube connecting to said inlet chuck by an inlet channel in said bottle engaging cap, with said outlet chuck connected to an outlet channel integrating with said headspace above said foaming solution;

a length of foam tubing connected to said outlet chuck extending along said left arm of said boom sprayer apparatus, said length of foam tubing having a restricted right angled elbow connected to a vertical drop tube from which foam is dispensed, said drop tube extending below said left arm of said boom sprayer apparatus above said left outer boundary of said treated area, wherein said three way switch allows for said foam to be dispensed to either said right or left outer boundary by activating either said right air compressor or said left air compressor generating and delivering said foam to said corresponding drop tube attached to the right arm or left arm of said boom sprayer apparatus.

* * * * *